Figure 1:
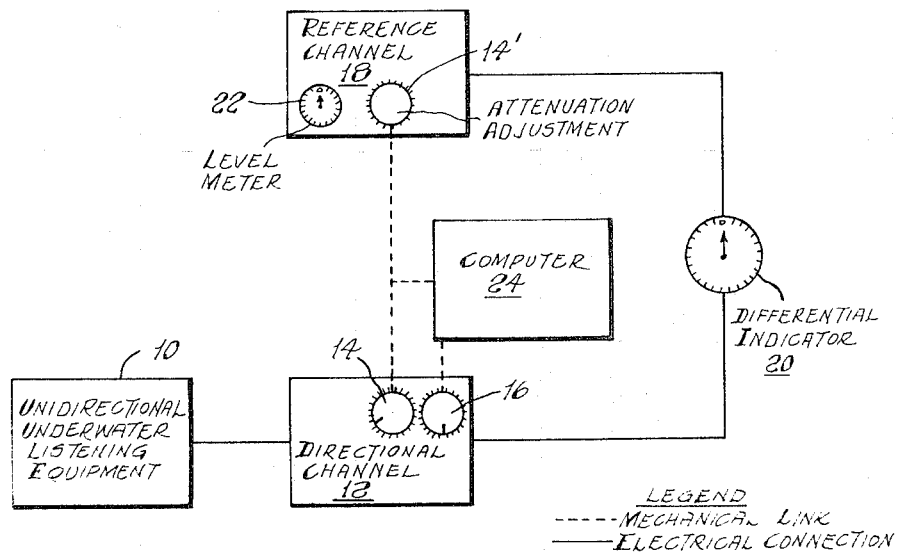

Dec. 13, 1966  L. T. EINSTEIN ETAL  3,292,139
SONAR PERFORMANCE COMPUTER
Filed Aug. 12, 1964  2 Sheets-Sheet 1

INVENTORS.
LLOYD T. EINSTEIN
WALLACE C. NORDSTROM
WILLIAM A. VON WINKLE
BY
AGENT
ATTORNEY

United States Patent Office 3,292,139
Patented Dec. 13, 1966

3,292,139
SONAR PERFORMANCE COMPUTER
Lloyd T. Einstein, New London, and Wallace C. Nordstrom and William A. Von Winkle, Waterford, Conn., assignors to the United States of America as represented by the Secretary of the Navy
Filed Aug. 12, 1964, Ser. No. 389,230
7 Claims. (Cl. 340—5)

The invention described herein may be manufactured and used by or for the Government of the United States of America for governmental purposes without the payment of any royalties thereon or therefor.

This invention relates to an equipment for and a method of measuring the significant parameters which determine the performance of passive sonar referred to hereinafter as a directional listening equipment.

The figure of merit (abbreviated $N_{FM}$) of a directional listening equipment is a single number which expresses the resultant effect of four measurable factors, each of which is significantly related to the operational performance of the directional listening equipment in terms of probable detection range.

The four measurable quantities which determine the figure of merit are as follows:

$L_S$—the level of the signal from the signal source, as measured at the source.

$N_{RD}$—the amount by which the level of the received signal must exceed the received noise at each frequency for a 50 percent probability of detection of the signal, expressed in db (decibels); this quantity is also called the recognition differential.

$L_N$—the level of noise background through which the signal must be detected, measured with a nondirectional hydrophone located in the position of the listening elements of the sonar under test; this quantity also is called the noise level.

$N_{DI}$—the amount by which the background noise is apparently decreased because of the directionality of the sonar, expressed in db; this quantity also is called effective directivity index.

Each of these factors is a function of frequency and therefore the figure of merit is expressed as a function of frequency. If the values of the four factors are known, the figure of merit is found by combining the quantities according to the relation $$N_{FM} = L_S - N_{RD} + N_{DI} - L_N$$

The figure of merit and factors ancillary thereto are discussed at length in Fundamentals of Sonar, by J. W. Horton, published by United States Naval Institute, Annapolis, Maryland, 1957.

An object of this invention is to provide a method and apparatus for use by ship's personnel for carrying out a routine check on the performance of a ship's directional listening system, rapidly, simply, and without need for mathematical computations or analyses, and more particularly to obtain data indicative of the maximum range at which an acoustic source of known characteristics is likely to be detected under a set of actual conditions.

A further object is to provide an improved method and apparatus for use in obtaining the figure of merit of a ship's directional listening system.

A further object is to provide an apparatus for measuring $L_N$, $N_{DI}$, and that part of the figure of merit equation concerning these two measurable quantities $$(N_{DI} - L_N)$$

Other objects and advantages will appear from the following description of an example of the invention, and the novel features will be particularly pointed out in the appended claims.

Figure 2:
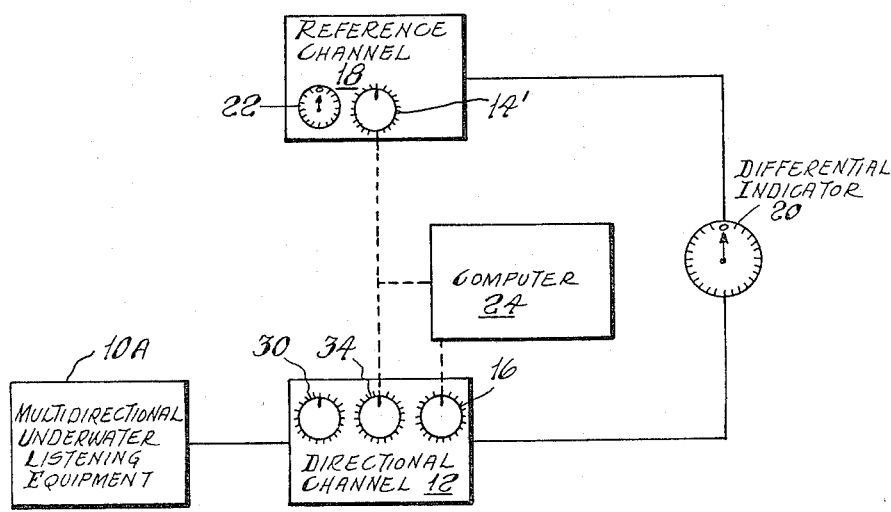
Figure 3:
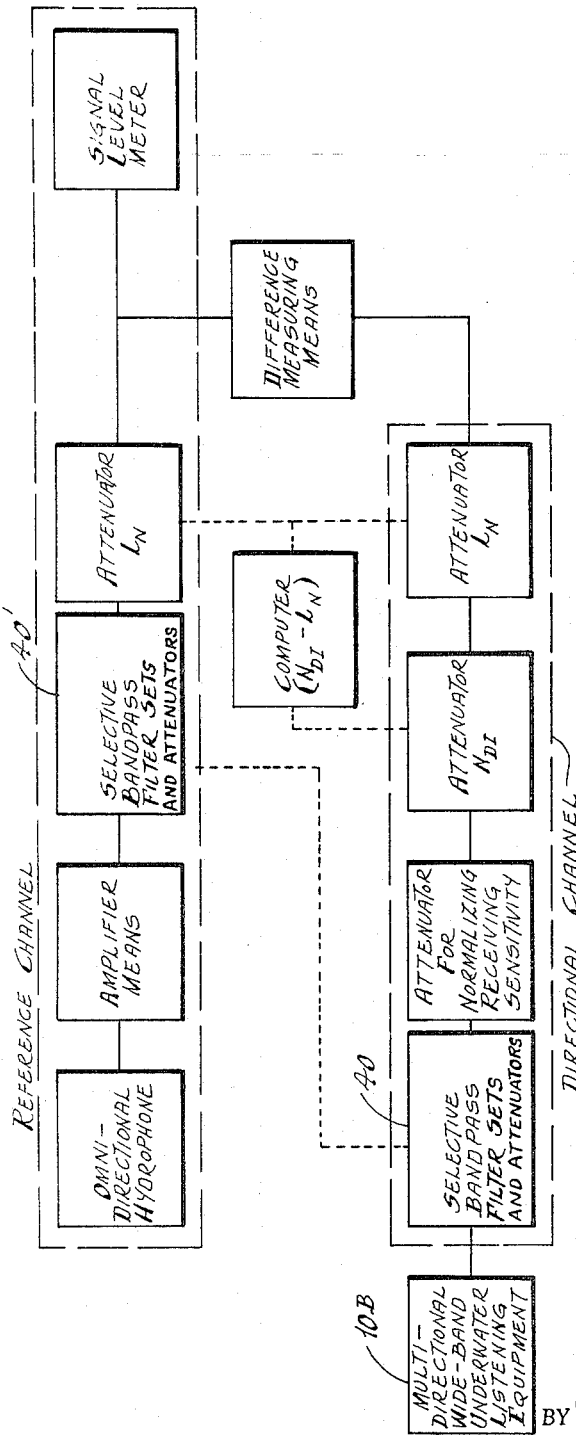

FIG. 1 is a block diagram of an embodiment of this invention including the basic elements of the invention for use with a unidirectional, narrow band listening equipment, FIG. 2 is a block diagram of a modification of the embodiment shown in FIG. 1 for use with a trainable multidirectional narrow-band listening equipment, FIG. 3 is a further embodiment for a trainable, multidirectional, wide-band listening equipment.

The embodiment shown in FIG. 1 is designed for use with unidirectional underwater listening equipment 10 having one directional axis and one narrow operating frequency band. A directional channel 12 is coupled to the listening equipment 10. The directional channel includes amplifier means, not shown, and a pair of manually adjustable attenuator means 14 and 16, connected in circuit with the amplifier means. The attenuator means are independent of each other and each directly controls the output of the channel. The output of the directional channel 12 is compared to the output of a reference channel 18 in a differential indicator 20 which affords a zero or reference indication when the output energies are equal.

The reference channel 18 includes an omni-directional hydrophone, not shown, physically supported near the sensing elements of the underwater directional listening equipment 10, and amplifier means in circuit with the hydrophone, an adjustable attenuator means 14' in circuit with the amplifier means for controlling the gain of the reference channel, and an energy level meter 22 which is used for registering a particular level of output of the reference channel. Both channels have the same narrow frequency band as the listening equipment and have essentially constant gain over that frequency band, for any selected settings of the attenuator means. The attenuator means 14 and 14' are essentially identical and are mechanically coupled together so that equal attenuation is introduced into both channels at all times by the attenuator means 14 and 14', respectively.

With the attenuator means 14 and 14' set for zero attenuation or a selected reference level of attenuation, the reference channel registers a reference output on the level meter 22 when the hydrophone senses a predetermined level in that frequency band. The predetermined level selected for reference purposes is substantially lower than the lowest acoustic level encountered in the sea when the ship is extra quiet. The attenuators 14 and 14' are calibrated to indicate acoustic level directly. The described elements of the reference channel are selected to have the dynamic range to enable the reference channel to measure the highest and lowest acoustic levels of interest.

In the directional channel, the attenuator 16 has an intermediate reference level of attenuation whereby it can be used to increase or reduce attenuation relative to that reference level. The two channels are correlated with the attenuator 16 in its reference level setting. To adjust the directional channel, a signal source is located along the directional axis of the listening equipment and at a sufficient distance for signal energy from the signal source to reach the listening equipment and hydrophone as planar waves. The signal source emits a white noise signal in said operating frequency band, of constant intensity, and of sufficient intensity such that the level of the signal at the directional listening elements and the omnidirectional hydrophone is several times, preferably on the order of 10 db above the level of sea noise or other incident acoustic energy. The attenuators 14 and 14' are adjusted to zero the level meter. With attenuator means 16 in the reference position, the directional channel amplifier is adjusted to zero the differential indicator 20.

A computer 24 is connected to the adjustable elements of the attenuator means 14 and 14' and to the adjustable element of attenuator means 16. The computer indicates difference of attenuation on the basis of the positions of the adjustable elements as compared to their reference positions. In FIG. 1, the attenuator means are represented by circular showings, e.g., the knobs of rotary potentiometers; however, slide wire and other adjustable attenuator means, though more cumbersome, may be used in this invention. The computer design is simpler where attenuators 14 and 16 are identical. In one form, the computer may include a scale movable by one of the attenuator means and a pointer, window, or the like movable by the other attenuator means. In another form, the computer may include a differential gear device coupled to the respective attenuators; the output of the differential gear device is coupled to a scale, pointer, etc. It is preferable though not essential to the invention that the attenuator means be logarithmic devices for wide dynamic range and for calibration in terms of decibels. Also, if the attenuator devices are logarithmic rotary potentiometer devices, the attenuator means 14 may be calibrated to indicate noise level in terms of decibels referred to the reference level of the reference channel. Likewise, the attenuator means 16 may be calibrated relative to its reference level of attenuation to indicate directivity gain or directivity index.

The invention is used at intervals to obtain the difference between directivity gain of the underwater directional listening equipment and noise level. First, the reference channel is adjusted to a setting for which the level meter 22 registers the reference indication. This step measures the noise level in the operating frequency band at the listening equipment and provides this measure to the computer 24. If the adjustable element of attenuator means 14' is calibrated, noise level can be read directly thereon. Equal attenuation is automatically introduced in the directional channel. Then the attenuator means 16 is adjusted until the meter 20 indicates equal outputs from both channels. If the adjustable element of attenuator means 16 is calibrated, directivity index can be read directly thereon.

In a noise field where the intensity in all directions is more or less the same, the output of the reference channel exceeds the output of the directional channel; the attenuator 16 must be adjusted to reduce the attenuation in the directional channel to equalize the outputs of the two channels. On the other hand, if the listening equipment is directed at a relatively intense noise source, the output of the directional channel will exceed the output of the reference channel due to the relatively high gain of the listening equipment. In the latter instance, attenuation in the directional channel is increased to equalize the gain from both channels. The sign of the directivity gain information supplied to the computer is opposed to that in the previously described circumstance.

The higher the sea noise and/or own ship's noise, the lower the figure of merit. Operationally, new measurements are needed whenever there is a change in sea condition, own ship's condition, or when a generally noisy area such as an active port is close enough to have significant effect.

If the attenuator means 14 and 16 are not logarithmic, the computer is provided with a logarithmic converter to convert the respective attenuator position inputs to their logarithmic equivalents prior to the operation described, in order to obtain directivity index $N_{DI}$ minus noise level $L_N$ in logarithmic terms for the figure of merit equation discussed in Fundamentals of Sonar.

The invention has been described thus far for a listening equipment having one directional axis and one narrow frequency band. The trainable multidirectional listening equipment 10A in FIG. 2 differs from the listening equipment 10 in FIG. 1 in that it has more than one listening axis. The listening beams along the different axes, generally differ. In FIG. 2, the directional channel includes a third independent adjustable attenuator means 30 having reference markings whereby previously selected settings may be identified and repeated; calibration markings may be used as reference markings but calibration is not essential. The initial differences in listening characteristics in the various directions are normalized with the attenuator means 30. The setting of the attenuator means 30 for each beam direction is determined with the directional index attenuator means 16 set in its reference or zero setting and by selecting one listening axis, e.g., the main listening axis as a reference. As previously described in connection with the embodiment shown in FIG. 1, a signal source is located along the main listening axis far enough away for the signal to arrive at the listening equipment as planar waves. The signal is in the order of 10 db above the sea noise in that band. The attenuators 14 and 14' are adjusted to zero the level meter in the reference channel. Then the attenuator means 30 is adjusted to zero the differential indicator 20. The setting of attenuator means 30 for that direction is marked on the attenuator or recorded elsewhere. Then the relative orientation of the listening equipment and signal source is changed to locate the signal source along each of the other listening axes in succession, at the same distance as previously and providing the same signal level as previously. In each case, the reference channel is zeroed with the attenuator means 16 set for the reference attenuation and then the attenuator means 30 is adjusted to zero the differential indicator 20. The settings of the attenuator means 30 for the various listening directions are marked on the attenuator means or recorded; this data is subsequently used for normalizing the response of the listening equipment during usage of the equipment.

The multidirectional listening equipment 10B in FIG. 3 has a wide operating band, or at least too wide for using this invention to make one measurement over the entire operating band. Therefore the operating frequency band is subdivided. In this invention, noise level is measured by the reference channel in terms of a reference level. The reference level is established for one selected frequency band. In a broad frequency band, the level is dependent upon frequency. In order to use only one reference level for a broad band and to measure noise level in all subdivisions of the broad band in terms of that reference level, it may be necessary to insert a slope correction factor. For sea noise measurements as described herein, the correction factor is 1. If the operating band is divided into consecutive octave bands, 3 db of attenuation per octave is required to compensate for energy differences in the successive octave bands. For other band division, the appropriate attenuation factor is used.

In FIG. 3, the basic elements of the reference channel and directional channel are illustrated to include bandpass filter sets for the above-stated purpose. Identical selective bandpass filter sets and attenuators 40 and 40' are included in each channel and are ganged by switch devices, not shown, whereby the same band is selected in both channels. This embodiment is used in the same manner as the embodiments previously described.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. Apparatus for use in making performance measurements on an underwater listening equipment having one directional axis and one narrow operating frequency band comprising (a) an adjustable gain directional channel coupled to the output of the listening equipment, (b) an adjustable gain reference channel including an omnidirectional hydrophone supported in the vicinity of the listening elements of the underwater listening equipment, (c) a differential indicator device connected to the outputs of both channels for registering whether their outputs are equal, (d) said reference channel including means for indicating whether the output of the reference channel is equal to, less than, or greater than a predetermined reference level, wherein for a particular combination of reference channel gain and input in said frequency band to the hydrophone, its indicating means registers the reference level, (e) both channels including identical, ganged attenuator means for adjusting the gains of both channels equally, (f) said directional channel including a second attenuator means independent of said ganged attenuator means and for one selected setting of the second attenuator means, both channels provide equal outputs for an input signal in said frequency band deriving from a source along the directional axis of the listening equipment sufficiently distant for the signal to arrive as planar waves and several times the intensity of sea noise in that frequency band incident to the hydrophone and the listening elements, (g) and a computer device coupled to the ganged attenuator means and to the second attenuator means for measuring the difference of attenuation of the second attenuator means relative to its reference setting and the attenuation of the ganged attenuator means relative to its reference setting.

2. Apparatus for use in making performance measurements on an underwater listening equipment having an operating frequency band and at least two directional axes comprising (a) an adjustable gain directional channel coupled to the output of the listening equipment, (b) an adjustable gain reference channel including an omnidirectional hydrophone supported in the vicinity of the listening elements of the underwater listening equipment, (c) identical ganged filter sets in the two channels for frequency bands within said operating frequency band and with respect to white noise input, the output energies in the respective bands are equal, (d) a differential indicator device connected to the outputs of both channels for use in registering whether their outputs are equal, (e) said reference channel including means for indicating whether the output of the reference channel is equal to, less than, or greater than a predetermined reference level, wherein for a particular combination of reference channel gain and input in one of the frequency bands to the hydrophone, its indicating means registers the reference level, (f) both channels including identical ganged attenuator means for adjusting the gains of both channels equally, (g) said directional channel including an independent second attenuator means for normalizing the response of the directional channel for all directional axes and all frequency bands, (h) said directional channel including an independent third attenuator means wherein for any selected setting both channels provide equal outputs for an input signal in any of said frequency bands deriving from a source along any one of the directional axes of the listening equipment sufficiently distant for the signal to arrive as planar waves and several times the intensity of sea noise in the selected frequency band incident to the hydrophone and the listening elements, and the second attenuator means is in the corresponding gain normalizing setting, (i) and a computer device coupled to the ganged attenuator means and to the third attenuator means for measuring the difference of attenuation of the third attenuator relative to its reference setting and the attenuation of the ganged attenuator means relative to its reference setting.

3. Apparatus for use in measuring directivity index minus noise level of a directional underwater listening equipment within a selected frequency band comprising:

(a) a reference channel of predetermined receiving sensitivity for sensing acoustic energy within said frequency band in the water in the immediate vicinity of the underwater listening equipment to provide output voltage in response to acoustic energy in said frequency band incident thereto omnidirectionally, (b) an adjustable attenuator in said reference channel, establishing a predetermined gain in said reference channel in one particular setting thereof, (c) another channel coupled to the output of said directional listening equipment for amplifying output voltage of said directional listening equipment, (d) another adjustable attenuator in said another channel ganged with said reference channel attenuator and identical thereto, (e) an independently adjustable attenuator in said another channel for use in adjusting its gain upward or downward relative to one particular setting thereof, (f) a differential meter coupled to the outputs of the two channels for use in guiding the adjustment of the independent attenuation to equalize the outputs from the two channels, (g) and means for continuously registering the difference between the attenuations provided by the ganged attenuators and the independent attenuator relative to their particular settings.

4. Apparatus as defined in claim 3, wherein:

(h) said another channel includes another independently adjustable attenuator for use in equalizing the gain of said another channel for all sensing directions of the listening equipment.

5. Apparatus as defined in claim 3, wherein:

(h) both said channels include identical filter means.

6. Apparatus as defined in claim 5, wherein:

(i) each of said filter means is a set of at least two filters for contiguous octave portions of said frequency band and together comprising said frequency band, the filters of each set having attenuators to produce equal band levels with white noise input.

7. Apparatus for use in checking the performance of a directional underwater listening equipment responsive to acoustic energy within a predetermined frequency range comprising (a) a reference acoustic channel for measuring the omnidirectional acoustic energy incident to the location of the sensing elements of the listening equipment, (b) a directional channel coupled to the output of the underwater listening equipment, (c) said channels including identical adjustable attenuator means, (d) said reference channel including means for providing a reference indication when its attenuator means introduces a predetermined attenuation and the incident acoustic energy is at a predetermined level, whereby when the acoustic field is of unknown level and the attenuator means therein is adjusted to where said means provides said reference indication, the directional channel is attenuated by a like amount, (e) adjustable attenuator means in said directional channel for normalizing the gain of said underwater listening equipment in its various directions, (f) a differential meter connected between the outputs of said reference channel and directional channel, (g) adjustable attenuator means in said directional channel for use in obtaining zero indication on the differential meter after the other attenuator means are adjusted for said reference indication and for normalizing the gain, (h) and means mechanically coupled to the first mentioned attenuator means and the last mentioned attenuator means for indicating the difference between the calibrated attenuation required for zeroing the differential meter and the calibrated attenuation required for the reference indication.

References Cited by the Examiner

UNITED STATES PATENTS 2,706,285   4/1955   Scott _____ 340—3

CHESTER L. JUSTUS, *Primary Examiner.*

RODNEY D. BENNETT, *Examiner.*

R. A. FARLEY, *Assistant Examiner.*